United States Patent
Kang et al.

(10) Patent No.: US 7,619,709 B2
(45) Date of Patent: Nov. 17, 2009

(54) LIQUID CRYSTAL DISPLAY PANEL AND FABRICATING METHOD THEREOF

(75) Inventors: Sung-Chun Kang, Kyongsangbuk-do (KR); Sun-Gi Lee, Kangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/326,374

(22) Filed: Dec. 23, 2002

(65) Prior Publication Data
US 2003/0179334 A1 Sep. 25, 2003

(30) Foreign Application Priority Data
Mar. 20, 2002 (KR) .................. 10-2002-0015126

(51) Int. Cl.
*G02F 1/1343* (2006.01)
*G02F 1/1345* (2006.01)
(52) U.S. Cl. ...................... 349/139; 349/149
(58) Field of Classification Search ................ 349/139, 349/143, 149
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,396,356 A * | 3/1995 | Fukuchi | 349/153 |
| 5,404,045 A * | 4/1995 | Mizushima | 257/698 |
| 5,406,989 A | 4/1995 | Abe | |
| 5,499,128 A | 3/1996 | Hasegawa et al. | |
| 5,507,323 A | 4/1996 | Abe | |

(Continued)

FOREIGN PATENT DOCUMENTS

EP 1 003 066 A1 5/2000

(Continued)

OTHER PUBLICATIONS

Merriam Webster's Collegiate Dictionary 10th Ed. © 2001 at p. 5.*

(Continued)

*Primary Examiner*—Dung T. Nguyen
(74) *Attorney, Agent, or Firm*—McKenna Long & Aldridge LLP

(57) ABSTRACT

A liquid crystal display panel and fabricating method thereof. The present invention forms the dummy lines in the areas separating the gate lines extended to the dummy area from the image display part of the liquid crystal display panel with the same opaque metal material of the data lines and the other dummy lines in the areas separating the data lines with the same opaque metal material of the gate lines. Thus, the dummy lines block the light. Therefore, the present invention minimizes the generation of the spot degradation caused by the scratches on the black matrix or the particles attached/detached to/from the black matrix in the dummy area as well as reduces the time taken for checking the spot degradation, thereby increasing quality of display and productivity.

9 Claims, 3 Drawing Sheets

U.S. PATENT DOCUMENTS

| | | | |
|---|---|---|---|
| 5,511,591 A | 4/1996 | Abe | |
| 5,539,545 A | 7/1996 | Shimizu | |
| 5,548,429 A | 8/1996 | Tsujita | |
| 5,619,358 A * | 4/1997 | Tanaka et al. | 349/143 |
| 5,642,214 A | 6/1997 | Ishii | |
| 5,680,189 A | 10/1997 | Shimizu et al. | |
| 5,742,370 A | 4/1998 | Kim | |
| 5,757,451 A | 5/1998 | Miyazaki | |
| 5,838,411 A * | 11/1998 | Hayakawa et al. | 349/139 |
| 5,852,484 A | 12/1998 | Inoue et al. | |
| 5,854,664 A | 12/1998 | Inoue et al. | |
| 5,861,932 A | 1/1999 | Inata | |
| 5,875,922 A | 3/1999 | Chastine et al. | |
| 5,952,676 A | 9/1999 | Sato | |
| 5,956,112 A | 9/1999 | Fujimori | |
| 5,982,470 A * | 11/1999 | Nakahara et al. | 349/153 |
| 5,995,189 A * | 11/1999 | Zhang | 349/153 |
| 6,001,203 A | 12/1999 | Yamada | |
| 6,011,609 A * | 1/2000 | Kato et al. | 349/190 |
| 6,016,178 A | 1/2000 | Kataoka | |
| 6,016,181 A | 1/2000 | Shimada | |
| 6,055,035 A | 4/2000 | Von Gutfeld | |
| 6,088,073 A * | 7/2000 | Hioki et al. | 349/40 |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami et al. | |
| 6,337,730 B1 | 1/2002 | Ozaki | |
| 6,414,733 B1 | 7/2002 | Ishikawa | |
| 2001/0021000 A1 | 9/2001 | Egami | |
| 2004/0179164 A1 * | 9/2004 | Zhang | 349/149 |

FOREIGN PATENT DOCUMENTS

| | | |
|---|---|---|
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | 06-051256 A1 | 2/1994 |
| JP | 06-148657 A1 | 5/1994 |
| JP | 06-160871 | 6/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 08-095066 A1 | 4/1996 |
| JP | 08-101395 | 4/1996 |
| JP | 08-106101 A1 | 4/1996 |
| JP | 08-171094 A1 | 7/1996 |
| JP | 08-190099 A1 | 7/1996 |
| JP | 08-240807 A1 | 9/1996 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-227589 | 8/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 A1 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133768 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-166322 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001-255542 | 9/2001 |
| JP | 2001-264782 | 9/2001 |

| | | | | | | |
|---|---|---|---|---|---|---|
| JP | 2001-201750 | 10/2001 | | JP | 2002-107740 A1 | 4/2002 |
| JP | 2001-272640 | 10/2001 | | JP | 2002-122872 A1 | 4/2002 |
| JP | 2001-281675 | 10/2001 | | JP | 2002-122873 A1 | 4/2002 |
| JP | 2001-281678 | 10/2001 | | JP | 2002-139734 | 5/2002 |
| JP | 2001-282126 | 10/2001 | | JP | 2002-202512 A1 | 7/2002 |
| JP | 2001-305563 | 10/2001 | | JP | 2002-202514 A1 | 7/2002 |
| JP | 2001-330837 | 11/2001 | | JP | 2002-214626 A1 | 7/2002 |
| JP | 2001-330840 A1 | 11/2001 | | KR | 1998-019093 | 6/1998 |
| JP | 2001-356353 | 12/2001 | | KR | 2000-035302 A1 | 6/2000 |
| JP | 2001-356354 A1 | 12/2001 | | | | |
| JP | 2002-014360 A1 | 1/2002 | | | | |
| JP | 2002-023176 A1 | 1/2002 | | | | |
| JP | 2002-049045 A1 | 2/2002 | | | | |
| JP | 2002-082340 A1 | 3/2002 | | | | |
| JP | 2002-090759 A1 | 3/2002 | | | | |
| JP | 2002-090760 A1 | 3/2002 | | | | |

OTHER PUBLICATIONS

Office Action issued by the Chinese Patent Office on Jun. 30, 2006 (w/ English Translation).

* cited by examiner

LIQUID CRYSTAL DISPLAY PANEL AND FABRICATING METHOD THEREOF

This application claims the benefit of the Korean Patent Application No. P2002-15126 filed on Mar. 20, 2002, which is hereby incorporated by reference for all purposes as if fully set forth herein.

BACKGROUND OF THE INVENTION

1. Field of the Invention

The present invention relates to a liquid crystal display panel and fabricating method thereof suitable for preventing spot degradation on a periphery of an image display part displaying an image of a unit liquid crystal display panel.

2. Discussion of the Related Art

Generally, a liquid crystal display device supplies liquid crystal cells arranged like a matrix with data signals according to image information respectively to display a demanded image by controlling a light-transmittance of each of the liquid crystal cells.

The liquid crystal display device includes a liquid crystal display panel having pixel unit liquid crystal cells arranged in a matrix and a driver integrated circuit (IC) for driving the liquid crystal cells.

The liquid crystal display panel includes a color filter substrate, a thin film transistor array substrate confronting the color filter substrate, and a liquid crystal layer filling a space between the color filter and thin film transistor array substrates.

On the thin film transistor array substrate of the liquid crystal display panel, data lines for transmitting data signals supplied from a data driver integrated circuit to the liquid crystal cells cross with gate lines for transmitting scan signals supplied from a gate driver integrated circuit to the liquid crystal cells, respectively. The liquid crystal cells are formed at crossings of the data and gate lines, respectively. Moreover, data and gate pads, to which the data and scan signals are applied from the data and gate driver integrated circuits, respectively, are formed at ends of the data and gate lines, respectively.

The gate driver integrated circuit sequentially supplies the scan signals to the gate lines to select the matrix-like arranged liquid crystal cells one by one. The data signal is applied to the liquid crystal cells on each of the selected lines from the data driver integrated circuit.

Meanwhile, a common electrode and pixel electrodes are formed on inner surfaces of the color filter and thin film transistor array substrates facing each other, respectively to apply an electric field to the liquid crystal layer. In this case, the pixel electrodes are formed in the liquid crystal cells of the thin film transistor array substrate, respectively. Yet, the common electrode is built in one body on the entire surface of the color filter substrate. Hence, one voltage applied to each of the pixel electrodes is controlled while the other voltage is applied to the common electrode, thereby enabling the control of light transmittance of each of the liquid crystal cells individually.

Moreover, a thin film transistor used as a switching device is formed in each of the liquid crystal cells. In the liquid crystal cell having a gate electrode of the thin film transistor supplied with the scan signal through the gate line, a conductive channel is generated between source and drain electrodes of the thin film transistor. In this case, the data signal applied to the source electrode of the thin film transistor through the data line is applied to the corresponding pixel electrode via the drain electrode of the thin film transistor, whereby the electric field is applied to the liquid crystal layer of the corresponding liquid crystal cell.

The above-described liquid crystal display panel is explained in detail as follows.

FIG. 1 illustrates a schematic layout of a unit liquid crystal display panel constructed with a thin film transistor array substrate and a color filter substrate bonded to each other to confront according to a related art.

Referring to FIG. 1, a unit liquid crystal display panel 10 includes an image display part 13 having liquid crystal cells arranged in a matrix form, a gate pad part 14 connecting gate lines GL1~GLm of the image display part 13 to a gate driver integrated circuit (not shown in the drawing) supplying gate signals, and a data pad part 15 connecting data lines DL1~DLn of the image display part 13 to a data driver integrated circuit (not shown in the drawing) supplying image information. In this case, the gate and data pad parts 14 and 15 are formed on edge areas of a thin film transistor array substrate 1 having one long and one short side protruding from the sides of the color filter substrate 2.

In this case, in areas provided by the data and gate lines DL1~DLn and GL1~GLm crossing with each other on the thin film transistor array substrate 1, thin film transistors are formed to switch liquid crystal cells, respectively, pixel electrodes are connected to the thin film transistors to apply electric fields to the corresponding liquid crystal cells, and a passivation layer is formed on an entire surface to protect the data lines DL1~DLn, gate lines GL1~GLm, thin film transistors, and electrodes.

On the color filter substrate 2 color filters are formed coated thereon to separate by each cell area through a black matrix and a common electrode as a counter electrode of the pixel electrodes on the thin film transistor array substrate 1.

A cell gap is provided by the above-constructed thin film transistor array and color filter substrates 1 and 2 leaving a predetermined interval from each other. The thin film transistor array and color filter substrates 1 and 2 are bonded to each other by a sealing part (not shown in the drawing) formed on a periphery of the image display part 13. A liquid crystal layer (not shown in the drawing) is formed in a separating space between the thin film transistor array and color filter substrates 1 and 2.

Meanwhile, a dummy area 16 is formed on the periphery of the image display part 13 to provide a predetermined margin in combining the unit liquid crystal display panel 10 with a backlight assembly or an exterior frame.

In order to prevent light from leaking through edges of the unit liquid crystal display panel 10 when the light emitted from the backlight assembly is transmitted to the dummy area 16, a material such as a black matrix is coated on the dummy area 16.

FIG. 2 illustrates a cross-sectional view of the dummy area 16 of the unit liquid crystal display panel 10 along a cutting line I-I' in a direction in parallel with a short side of the unit liquid crystal display panel 10 in FIG. 1, in which a gate pad part 14 is generally formed on one of the short sides of the unit liquid crystal display panel 10.

Referring to FIG. 2, a thin film transistor array substrate 11 includes gate lines GL11 and GL12 patterned separate from each other on a first substrate 21, a gate insulating layer 22 over an entire surface of the first substrate 21 including the gate lines GL11 and GL12, and a passivation layer 23 on the gate insulating layer 22.

A color filter substrate 12 includes a black matrix 32 on a second substrate 31 to face the passivation layer 23 of the thin film transistor array substrate 11.

The thin film transistor array and color filter substrates 11 and 12 are bonded to face each other by being separated with a predetermined cell gap. A liquid crystal layer 17 is formed in a space between the thin film transistor array and color filter substrates 11 and 12.

FIG. 3 illustrates a cross-sectional view of the dummy area 16 of the unit liquid crystal display panel 10 along a cutting line II-II' in a direction in parallel with a long side of the unit liquid crystal display panel 10 in FIG. 1, in which a data pad part 15 is generally formed on one of the long sides of the unit liquid crystal display panel 10.

Referring to FIG. 3, a thin film transistor array substrate 11 includes a gate insulating layer 22 over an entire surface of the first substrate 21, data lines DL11 and DL12 patterned separate from each other on the gate insulating layer 22, and a passivation layer 23 over an entire surface of the first substrate 21 including the data lines DL11 and DL12.

A color filter substrate 12 includes a black matrix 32 on a second substrate 31 to face the passivation layer 23 of the thin film transistor array substrate 11.

The thin film transistor array and color filter substrates 11 and 12 are bonded to face each other by being separated with a predetermined cell gap. A liquid crystal layer 17 is formed in a space between the thin film transistor array and color filter substrates 11 and 12.

As mentioned in the foregoing explanation, the black matrix coated on the color filter substrate 12 blocks the light in order to prevent the light from leaking through edges of the unit liquid crystal display panel 10 according to the related art when the light emitted from the backlight assembly beneath the thin film transistor array substrate 11 is transmitted to the dummy area 16.

Thus, even if the liquid crystal display panel according to the related art includes the black matrix coated on the color filter substrate 12 to block the light emitted from the backlight assembly beneath the thin film transistor array substrate 11 so as not to transmit to the dummy area, spot degradation occurs in the dummy area of the liquid crystal display panel when the black matrix is scratched or particles adhere to or are detached from the black matrix. Hence, the quality of display is degraded.

Moreover, the spot degradation distributed irregularly on the dummy area is difficult to check as well as time taken for such a check is delayed, whereby productivity is reduced.

SUMMARY OF THE INVENTION

Accordingly, the present invention is directed to a liquid crystal display panel and fabricating method thereof that substantially obviates one or more problems due to limitations and disadvantages of the related art.

An advantage of the present invention is to provide a liquid crystal display panel and fabricating method thereof that prevents spot degradation on a periphery of an image display part displaying an image of a unit liquid crystal display panel.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display panel according to the present invention includes first and second substrates bonded to each other, an image display part and a dummy area defined on the first and second substrates, conductive lines on the first substrate in the dummy area to leave a predetermined interval from each other, and dummy lines on areas separating the conductive lines.

In another aspect of the present invention, a method of fabricating a liquid crystal display panel includes forming conductive lines on a dummy area of a first substrate to leave a predetermined interval from each other, the first substrate having an image display part and the dummy area, forming a first insulating layer on the first substrate having the conductive lines, forming dummy lines on the first insulating layer, and forming a second insulating layer on the first insulating layer.

In a further aspect of the present invention, a method of fabricating a liquid crystal display panel includes forming dummy lines on a dummy area of a first substrate to leave a predetermined interval from each other, the first substrate having an image display part and the dummy area, forming a first insulating layer on the first substrate, forming conductive lines on the first insulating layer, and forming a second insulating layer on the first insulating layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1:
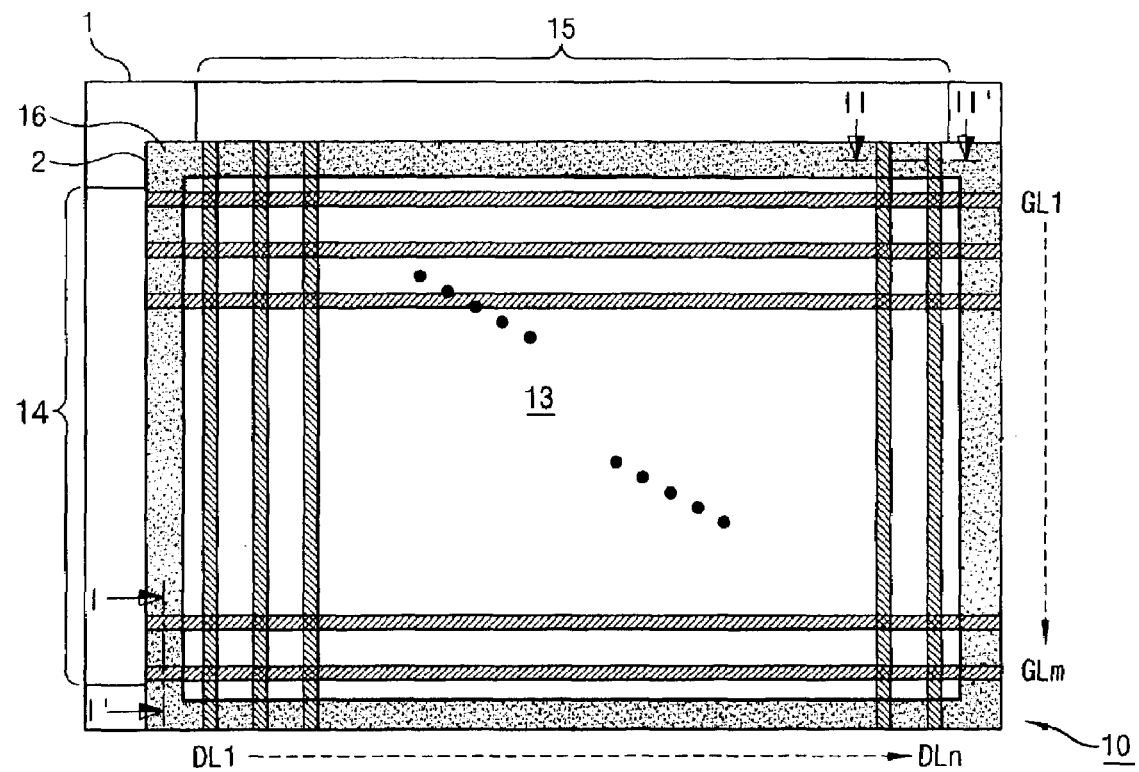
FIG. 1 illustrates a schematic layout of a unit liquid crystal display panel constructed with a thin film transistor array substrate and a color filter substrate bonded to each other to confront according to a related art.
Figure 2:
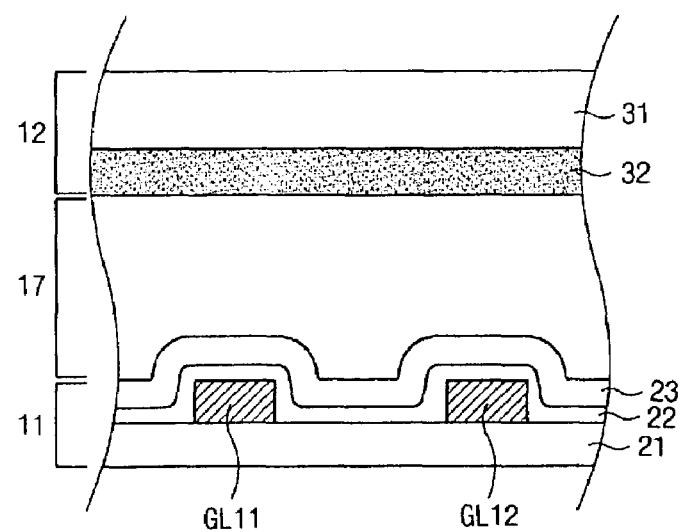
FIG. 2 illustrates a cross-sectional view of a dummy area of a unit liquid crystal display panel along a cutting line I-I' in a direction in parallel with a short side of the unit liquid crystal display panel in FIG. 1.
Figure 3:
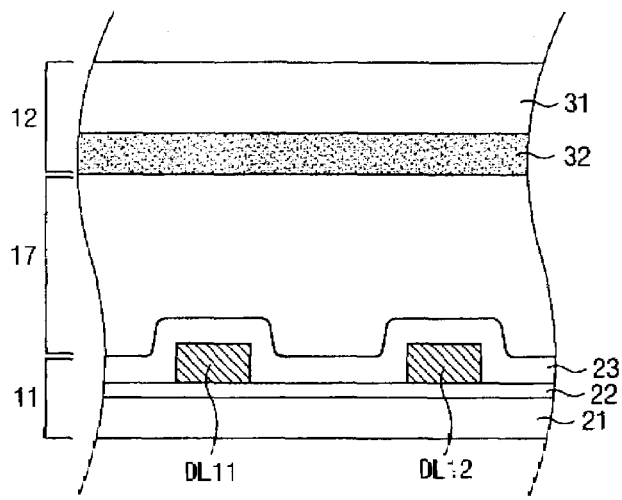
FIG. 3 illustrates a cross-sectional view of a dummy area of a unit liquid crystal display panel along a cutting line II-II' in a direction in parallel with a long side of the unit liquid crystal display panel in FIG. 1.
Figure 4:
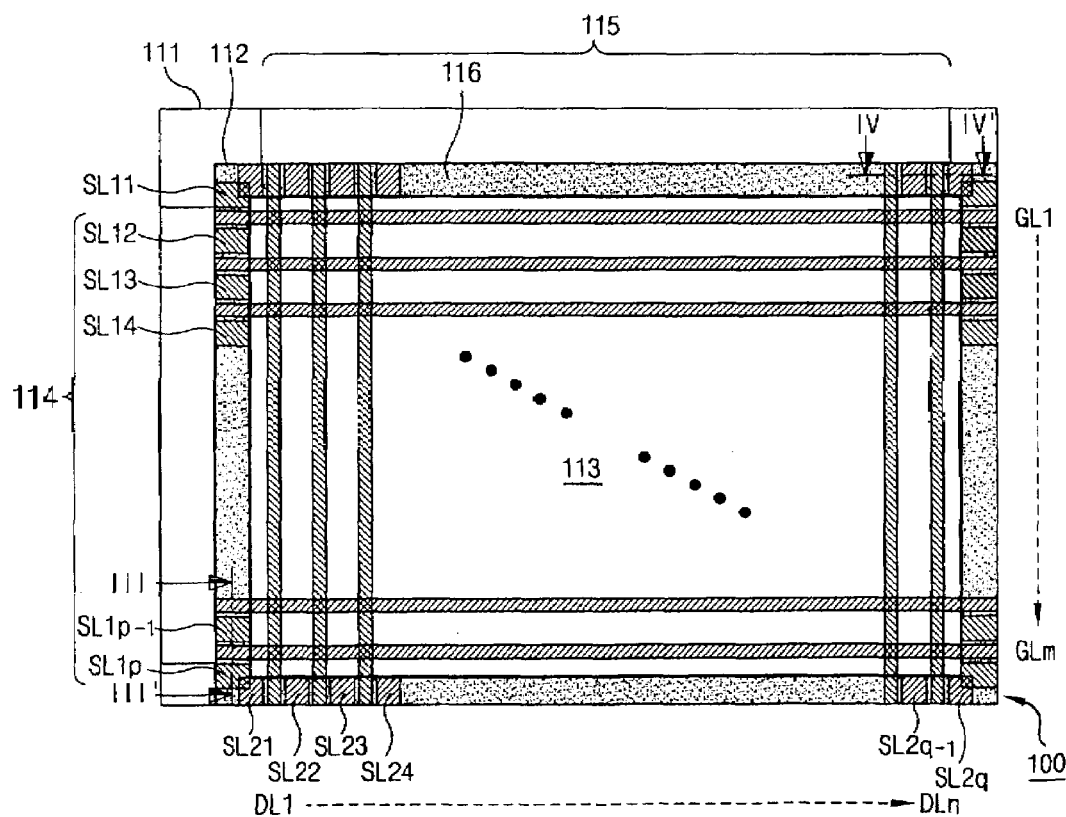
FIG. 4 illustrates a schematic layout of a unit liquid crystal display panel according to one embodiment of the present invention.

FIG. 4 illustrates a schematic layout of a unit liquid crystal display panel according to one embodiment of the present invention.

Referring to FIG. 4, a unit liquid crystal display panel 100 includes an image display part 113 having liquid crystal cells arranged in a matrix form, a gate pad part 114 connecting gate lines GL1~GLm of the image display part 113 to a gate driver integrated circuit (not shown in the drawing) supplying gate signals, and a data pad part 115 connecting data lines DL1~DLn of the image display part 113 to a data driver integrated circuit (not shown in the drawing) supplying image information. In this case, the gate and data pad parts 114 and 115 are formed on edge areas of a thin film transistor array substrate 111 having one long and one short side protruding longer than those of a color filter substrate 112.

In this case, in areas provided by the data and gate lines DL1~DLn and GL1~GLm crossing with each other on the thin film transistor array substrate 111, thin film transistors are formed to switch liquid crystal cells, respectively, pixel electrodes are connected to the thin film transistors to apply electric fields to the corresponding liquid crystal cells, and a passivation layer is formed on an entire surface to protect the data lines DL1~DLn, gate lines GL1~GLm, thin film transistors, and electrodes.

On the color filter substrate 112 color filters are formed coated thereon to separate each cell area through a black matrix and a common electrode as a counter electrode of the pixel electrodes on the thin film transistor array substrate 111.

A cell gap is provided by the above-constructed thin film transistor array and color filter substrates 111 and 112 leaving a predetermined interval from each other. The thin film transistor array and color filter substrates 111 and 112 are bonded to each other by a sealing part (not shown in the drawing) formed on a periphery of the image display part 113. A liquid crystal layer (not shown in the drawing) is formed in a space between the thin film transistor array and color filter substrates 111 and 112.

The liquid crystal layer is formed by a liquid crystal injection method including bonding a first mother substrate having the thin film transistor array substrates 111 to a second mother substrate having the color filter substrates 112 and injecting liquid crystals between the first and second mother substrates. Instead, the liquid crystal layer can be formed by dropping liquid crystals on one of the first and mother substrates and bonding the first and second mother substrates to each other in vacuum state.

Moreover, a sealant (not shown in the drawing) is formed on the mother substrate having the liquid crystals dropped thereon or failing to have the liquid crystals dropped thereon to bond the first and second mother substrates to each other.

Meanwhile, a dummy area 116 is formed on the periphery of the image display part 113 to provide a predetermined margin in combining the unit liquid crystal display panel 100 with a backlight assembly or an exterior frame.

In order to prevent light from leaking through edges of the unit liquid crystal display panel 100 when the light emitted from the backlight assembly is transmitted to the dummy area 116, a material such as a black matrix is coated on the dummy area 116. The gate and data lines GL1~GLm and DL1~DLn crossing with each other in the image display part 113 extend to the dummy area 116. In this case, the gate and data lines GL1~GLm and DL1~DLn are generally made of an opaque material of metal blocking light.

In one embodiment of the present invention, dummy lines SL11~SL1p are formed on areas separating the extending gate lines GL1~GLm from each other, respectively, and another dummy lines SL21~SL2q are formed on areas separating the extending data lines DL1~DLn from each other, respectively, The dummy lines SL11~SL1p on the areas separating the extending gate lines GL1~GLm can be formed by selectively patterning the same metal line of the data lines DL1~DLn. Another dummy lines SL21~SL2q on areas separating the extending data lines DL1~DLn can be formed by patterning the same metal line of the gate lines GL1~GLm selectively.

Since the gate lines GL1~GLm, data lines DL1~DLn, and dummy lines SL11~SL1p and SL21~SL2q are made of the opaque material of metal to prevent the transmission of light, the present invention prevents the spot degradation caused in the dummy area 116 by the scratch or the adsorption/detachment of particles on the black matrix.

Figure 5:
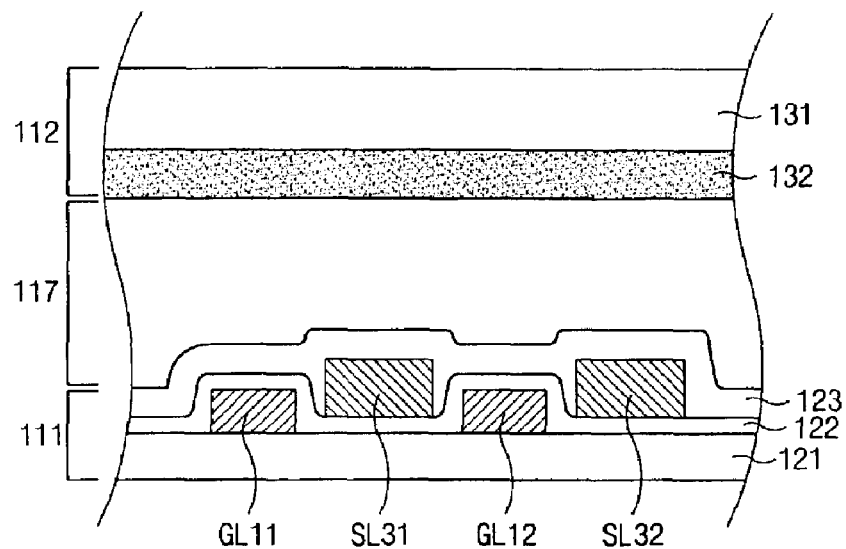
FIG. 5 illustrates a cross-sectional view of a dummy area in FIG. 4 along a cutting line III-III' in a direction in parallel with a short side of a unit liquid crystal display panel.

FIG. 5 illustrates a cross-sectional view of a dummy area in FIG. 4 along a cutting line III-III' in a direction in parallel with a short side of a unit liquid crystal display panel, in which a gate pad part 114 is generally formed on one of the short sides of the unit liquid crystal display panel 100.

Referring to FIG. 5, a thin film transistor array substrate 111 includes gate lines GL11 and GL12 patterned to separate from each other on a first substrate 121, a gate insulating layer 122 over an entire surface of the first substrate 121 including the gate lines GL11 and GL12, dummy lines SL31 and SL32 on the gate insulating layer 122 in areas separating the gate lines GL11 and GL12 from each other, and a passivation layer 123 on the gate insulating layer 122 including the dummy lines SL31 and SL32.

A color filter substrate 112 includes a black matrix 132 on a second substrate 131 to face the passivation layer 123 of the thin film transistor array substrate 111.

The thin film transistor array and color filter substrates 111 and 112 are bonded to face each other by being separated with a predetermined cell gap. A liquid crystal layer 117 is formed in a separating space between the thin film transistor array and color filter substrates 111 and 112.

As mentioned in the foregoing description, the liquid crystal layer 117 is formed by a liquid crystal injection method including the steps of bonding a first mother substrate having the thin film transistor array substrates 111 to a second mother substrate having the color filter substrates 112 and injecting liquid crystals between the first and second mother substrates. Instead, the liquid crystal layer can be formed by dropping liquid crystals on one of the first and mother substrates and bonding the first and second mother substrates to each other in vacuum state. Moreover, a sealant (not shown in the drawing) is formed on the mother substrate having the liquid crystals dropped thereon or failing to have the liquid crystals dropped thereon to bond the first and second mother substrates to each other.

Besides, the dummy lines SL31 and SL132 on the areas separating the extending gate lines GL11 and GL12 can be formed by selectively patterning the same metal line of the data lines DL1~DLn in FIG. 4.

Since the gate lines GL11 and GL12, data lines DL1~DLn, and dummy lines SL31~SL32 are made of the opaque material of metal to prevent the transmission of light, the present invention prevents the spot degradation caused in the dummy area 116 defined on the edges of the short sides by the scratches or the adsorption/detachment of particles on the black matrix.

A method of forming the dummy area 116 defined on the edges of the short sides of the unit liquid crystal display panel 100 is explained as follows.

First of all, gate lines GL11 and GL12 are patterned on a first substrate 121 to separate with a predetermined interval from each other. In this case, the gate lines GL11 and GL12 transmit scan signals supplied from a gate driver integrated circuit (not shown in the drawing) through a gate pad part 114 to an image display part 113 of a liquid crystal display panel 100.

A gate insulating layer 122 is formed on an entire surface of the first substrate 121 including the gate lines GL11 and GL12. In this case, the gate insulating layer 122 is formed on a dummy area 116 simultaneously when a gate insulating layer of a thin film transistor in each liquid crystal cell arranged in a matrix form in the image display part 113 of the unit liquid crystal display panel 100 is formed.

Subsequently, dummy lines SL31 and SL32 are formed on the gate insulating layer 122 of the areas separating the gate lines GL11 and GL12. In this case, the dummy lines SL31 and SL32 are formed on the dummy area simultaneously when data lines DL1~DLn crossing with the gate lines Gl11 and GL12 in the image display part 113 of the unit liquid crystal display panel 100 are patterned. The data lines DL1~DLn transmit image signals supplied from a data driver integrated circuit (not shown in the drawing) through a data pad part 115 to the image display part 113 of the liquid crystal display panel 100.

Thereafter, a passivation layer 123 is formed on the gate insulating layer 122 including the dummy lines SL31 and SL32. In this case, the passivation layer is formed on the dummy area 116 simultaneously when a passivation layer protecting the lines, thin film transistors, and electrodes on the image display part 113 of the unit liquid crystal display panel 100 is formed.

Meanwhile, a black matrix 132 blocking light is formed on a second substrate 131, and a thin film transistor array substrate 111 and a color filter substrate 112 are bonded to each other so that the black matrix 132 leaves a predetermined interval from the passivation layer 123 of the thin film transistor array substrate 111.

A liquid crystal layer 117 is formed in a separating space between the thin film transistor array and color filter substrates 111 and 112. As mentioned in the foregoing description, the liquid crystal layer 117 is formed by a liquid crystal injection method including bonding a first mother substrate having the thin film transistor array substrates 111 to a second mother substrate having the color filter substrates 112 and injecting liquid crystals between the first and second mother substrates. Instead, the liquid crystal layer can be formed by dropping liquid crystals on one of the first and mother substrates and bonding the first and second mother substrates to each other in vacuum state. Moreover, a sealant (not shown in the drawing) is formed on the mother substrate having the liquid crystals dropped thereon or failing to have the liquid crystals dropped thereon to bond the first and second mother substrates to each other.

Figure 6:
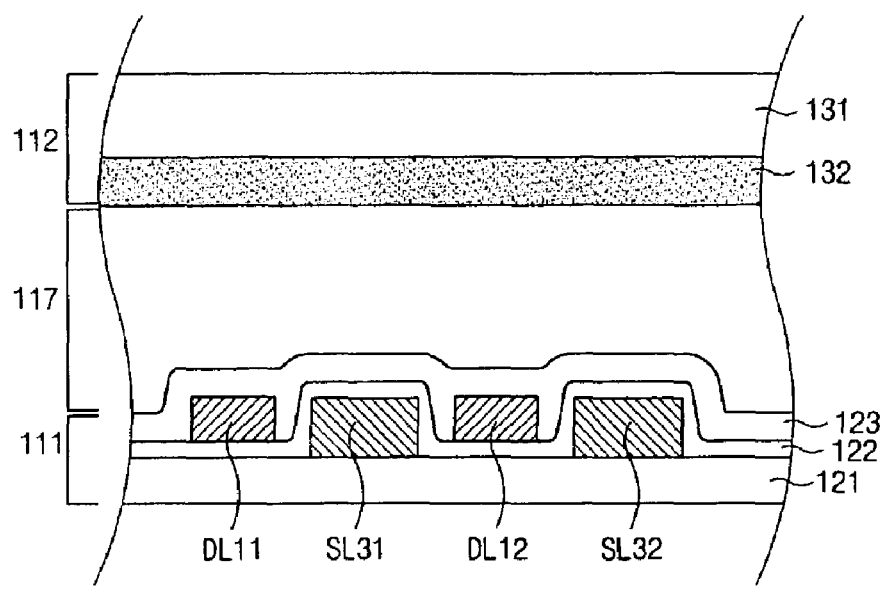
FIG. 6 illustrates a cross-sectional view of a dummy area in FIG. 4 along a cutting line IV-IV' in a direction in parallel with a long side of a unit liquid crystal display panel.

FIG. 6 illustrates a cross-sectional view of a dummy area in FIG. 4 along a cutting line IV-IV' in a direction in parallel with a long side of a unit liquid crystal display panel, in which a data pad part 115 is generally formed on one of long sides of the unit liquid crystal display panel 100.

Referring to FIG. 6, a thin film transistor array substrate 111 includes dummy lines SL31 and SL32 patterned on a first substrate 121 to leave a predetermined interval from each other, a gate insulating layer 122 over an entire surface of the first substrate 121 including the dummy lines SL31 and SL32, data lines DL11 and DL12 on the gate insulating layer 122 in areas separating the dummy lines SL131 and SL32 from each other, and a passivation layer 123 on an entire surface of the gate insulating layer 122 including the dummy lines SL31 and SL32.

A color filter substrate 112 includes a black matrix 132 on a second substrate 131 to confront the passivation layer 123 of the thin film transistor array substrate 111.

The thin film transistor array and color filter substrates 111 and 112 are bonded to face each other by being separated with a predetermined cell gap. A liquid crystal layer 117 is formed in a separating space between the thin film transistor array and color filter substrates 111 and 112.

As mentioned in the foregoing description, the liquid crystal layer 117 is formed by a liquid crystal injection method including bonding a first mother substrate having the thin film transistor array substrates 111 to a second mother substrate having the color filter substrates 112 and injecting liquid crystals between the first and second mother substrates. Instead, the liquid crystal layer 117 can be formed by dropping liquid crystals on one of the first and mother substrates and bonding the first and second mother substrates to each other in vacuum state. Moreover, a sealant (not shown in the drawing) is formed on the mother substrate having the liquid crystals dropped thereon or failing to have the liquid crystals dropped thereon to bond the first and second mother substrates to each other.

Besides, the dummy lines SL31 and SL32 on the areas separating the data lines DL11 and DL12 can be formed by selectively patterning the same metal line of the gate lines GL1~GLn in FIG. 4.

Since the data lines DL11 and DL12, gate lines GL1~GLn, and dummy lines SL31 and SL32 are made of the opaque material of metal to prevent the transmission of light, the present invention prevents the spot degradation caused in the dummy area 116 defined on the edges of the short sides by the scratches or the adsorption/detachment of particles on the black matrix.

A method of forming the dummy area 116 defined on the edges of the long sides of the unit liquid crystal display panel 100 is explained as follows.

First of all, dummy lines SL31 and SL32 are patterned on a first substrate 121 to separate with a predetermined interval from each other. In this case, the dummy lines SL31 and SL32 are formed in the dummy area 116 simultaneously when gate lines GL1~GLn are patterned in an image display part of the unit liquid crystal display panel 100. Moreover, the dummy lines SL31 and SL32 are patterned and formed in areas separating data lines DL11 and DL12 that will be formed afterward. The gate lines GL1~GLn transmit scan signals supplied from a gate driver integrated circuit (not shown in the drawing) through a gate pad part 114 to the image display part 113 of the unit liquid crystal display panel 100.

A gate insulating layer 122 is formed on an entire surface of the first substrate 121 including the dummy lines SL31 and SL32. In this case, the gate insulating layer 122 is formed on a dummy area 116 simultaneously when a gate insulating layer of a thin film transistor in each liquid crystal cell arranged like a matrix form in the image display part 113 of the unit liquid crystal display panel 100 is formed.

Subsequently, data lines DL11 and DL12 are formed on the gate insulating layer 122 of the areas separating the dummy lines SL31 and SL32. In this case, the data lines DL11 and DL12 transmit image information supplied from a data driver integrated circuit (not shown in the drawing) through a data pad part 115 to the image display part 113 of the liquid crystal display panel 100.

Thereafter, a passivation layer 123 is formed on the gate insulating layer 122 including the data lines DL11 and DL12. In this case, the passivation layer 123 is formed on the dummy area 116 simultaneously when a passivation layer protecting the lines, thin film transistors, and electrodes on the image display part 113 of the unit liquid crystal display panel 100 is formed.

Meanwhile, a black matrix 132 blocking light is formed on a second substrate 131, and a thin film transistor array substrate 111 and a color filter substrate 112 are bonded to each other so that the black matrix 132 leave a predetermined interval from the passivation layer 123 of the thin film transistor array substrate 111.

A liquid crystal layer 117 is formed in a separating space between the thin film transistor array and color filter substrates 111 and 112. As mentioned in the foregoing description, the liquid crystal layer 117 is formed by a liquid crystal injection method including bonding a first mother substrate having the thin film transistor array substrates 111 to a second mother substrate having the color filter substrates 112 and injecting liquid crystals between the first and second mother substrates. Instead, the liquid crystal layer can be formed by dropping liquid crystals on one of the first and mother substrates and bonding the first and second mother substrates to each other in vacuum state. Moreover, a sealant (not shown in the drawing) is formed on the mother substrate having the liquid crystals dropped thereon or failing to have the liquid crystals dropped thereon to bond the first and second mother substrates to each other.

As explained in the foregoing description, the liquid crystal display panel and fabricating method thereof form the dummy lines in the areas separating the gate lines extended to the dummy area from the image display part of the liquid crystal display panel with the same opaque metal material of the data lines and the other dummy lines in the areas separating the data lines with the same opaque metal material of the gate lines. Thus, the dummy lines block the light. Therefore, the present invention minimizes the generation of the spot degradation caused by the scratches on the black matrix or the particles attached/detached to/from the black matrix in the dummy area as well as reduces the time taken for checking the spot degradation, thereby increasing quality of display and productivity.

It will be apparent to those skilled in the art that various modifications and variations can be made in the device for controlling spreading of liquid crystal, and method for fabricating an LCD of the present invention without departing from the spirit or scope of the invention. Thus, it is intended that the present invention cover the modifications and variations of this invention provided they come within the scope of the appended claims and their equivalents.

What is claimed is:

1. A liquid crystal display panel comprising:
    first and second substrates bonded to each other;
    an image display part and a dummy area defined on the periphery of the image display part to provide a predetermined margin in combining a unit liquid crystal display panel with a backlight assembly or an exterior frame on the first and second substrates, the dummy area including a sealing unit;
    a plurality of gate lines and data lines in the image display part on the first substrate, the plurality of gate lines and data lines extending to the dummy area around all four sides of the image display part to leave a predetermined interval from each other;
    a black matrix formed on the second substrate in an area corresponding to the dummy area;
    a plurality of first dummy lines formed by selectively patterning the same metal of the data lines on areas separating the plurality of extending gate lines; and
    a plurality of second dummy lines formed by selectively patterning the same metal of the gate lines on areas separating the plurality of extending data lines,
    wherein the plurality of gate lines and data lines are formed in different layers on the first substrate, and
    wherein the plurality of first and second dummy lines are formed in different layers on the first substrate,
    wherein a portion of the plurality of first dummy lines overlaps with a portion of the plurality of second dummy lines at a corner of the dummy area.

2. The liquid crystal display panel of claim 1, further comprising a liquid crystal layer in a separating space between the bonded first and second substrates.

3. The liquid crystal display panel of claim 2, wherein the liquid crystal layer comprises liquid crystals dropped on at least one of the first and second substrates.

4. A method of fabricating a liquid crystal display panel, comprising:
    providing a first substrate having an image display part and a dummy area defined on the periphery of the image display part to provide a predetermined margin in combining a unit liquid crystal display panel with a backlight assembly or an exterior frame, the dummy area including a sealing unit;
    forming a plurality of gate lines and data lines on the image display part of the first substrate, the plurality of gate lines and data lines extending to the dummy area around all four sides of the image display part to leave a predetermined interval from each other;
    forming a black matrix layer on a second substrate in an area corresponding to the dummy area;
    forming a first insulating layer on the first substrate having the conductive lines;
    forming a purity of first dummy lines by selectively patterning the same metal of the data lines on areas separating the plurality of extending gate lines;
    forming a plurality of second dummy lines by selectively patterning the same metal of the gate lines on areas separating the plurality of extending data lines,
    wherein the plurality of gate lines and data lines are formed in different layers on the first substrate, and
    wherein the plurality of first and second dummy lines, are formed in different layers on the first substrate, and
    wherein a portion of the plurality of first dummy lines overlaps with a portion of the plurality of second dummy lines at a corner of the dummy area; and
    forming a second insulating layer on the first insulating layer.

5. The method of claim 4, wherein the first insulating layer is formed on the dummy area simultaneously when a gate insulating layer is formed on the image display part.

6. The method of claim 4, wherein the second insulating layer is formed on the dummy area simultaneously when a passivation layer is formed on the image display part.

7. The method of claim 4, further comprising:
bonding the second substrate to the first substrate to leave a predetermined interval between the second and first substrates wherein the second insulating layer of the first substrate faces the black matrix of the second substrate.

8. The method of claim 7, further comprising forming a liquid crystal layer in a separating space between the first and second substrates.

9. The method of claim 8, wherein forming the liquid crystal layer includes:

dropping liquid crystals on one of a first mother substrate having thin film transistor array substrates thereon and a second mother substrate having color filter substrates thereon;

forming a sealant on one of the first and second mother substrates; and bonding the first and second mother substrates to each other.

* * * * *